(12) United States Patent  
Sacks

(10) Patent No.: US 7,409,796 B2  
(45) Date of Patent: Aug. 12, 2008

(54) EXTRUDED LANDSCAPE EDGING STRIP AND METHOD OF MAKING SAME

(76) Inventor: Rael Sacks, 337 W. Bedford, Fresno, CA (US) 93711

( * ) Notice: Subject to any disclaimer, the term of this patent is extended or adjusted under 35 U.S.C. 154(b) by 554 days.

(21) Appl. No.: 10/615,967

(22) Filed: Jul. 9, 2003

(65) Prior Publication Data

US 2005/0005511 A1 Jan. 13, 2005

(51) Int. Cl.
*A01G 1/08* (2006.01)

(52) U.S. Cl. .......................................................... 47/33

(58) Field of Classification Search ............... 47/33; 52/102
See application file for complete search history.

(56) References Cited

U.S. PATENT DOCUMENTS

| | | | |
|---|---|---|---|
| 691,169 A | 1/1902 | Owen | |
| 2,782,561 A | 2/1957 | Smith | |
| 2,821,809 A | 2/1958 | Collier et al. | |
| 3,788,001 A | 1/1974 | Balfanz, Jr. | |
| 3,933,311 A * | 1/1976 | Lemelson | 239/276 |
| 4,820,469 A * | 4/1989 | Walsh et al. | 264/506 |
| 4,823,521 A | 4/1989 | Kontz, Jr. | |
| 5,020,272 A * | 6/1991 | Herrema et al. | 47/33 |
| 5,077,944 A * | 1/1992 | Backman | 52/102 |
| 5,117,583 A | 6/1992 | Reum | |
| 5,157,867 A | 10/1992 | Fritch | |
| 5,301,461 A | 4/1994 | Zwier | |
| 5,375,369 A | 12/1994 | VerHoeve | |
| 5,456,045 A | 10/1995 | Bradley et al. | |
| 5,715,628 A * | 2/1998 | Beladakis | 47/33 |
| 5,720,128 A | 2/1998 | Smith et al. | |
| D426,322 S | 6/2000 | Anderson et al. | |
| 6,108,969 A * | 8/2000 | Danna et al. | 47/33 |
| 6,389,742 B1 * | 5/2002 | Wuster | 47/33 |
| 6,546,688 B1 | 4/2003 | Parsons | |
| 6,579,605 B2 | 6/2003 | Zehner | |
| 2003/0024157 A1 | 2/2003 | Conde | |
| 2005/0005511 A1* | 1/2005 | Sacks | 47/33 |

FOREIGN PATENT DOCUMENTS

DE 3039971 A1 * 5/1982

* cited by examiner

*Primary Examiner*—Son T. Nguyen
(74) *Attorney, Agent, or Firm*—Fulwider Patton LLP

(57) ABSTRACT

A landscape edging system having an edging strip co-extruded from two different materials to form a core layer and a thin shell layer, with the shell layer generally encapsulating the core layer. The core layer can be made from relatively lower cost, quality and weight materials, such as re-grind or recycled plastic materials, and the shell layer can be made from higher quality materials that are selected for durability, appearance and resistance to corrosion, mildew and impacts. The core layer has one or more longitudinally disposed channels that receive a connector configured to connect adjacent edging strips together to form a boundary between landscaped and/or non-landscaped areas. The connector has a sleeve portion with an internal body member having extending portions configured to interact with the interior wall of the channels. A stake can be driven through the edging strip to secure it in place on the ground.

20 Claims, 3 Drawing Sheets

EXTRUDED LANDSCAPE EDGING STRIP AND METHOD OF MAKING SAME

BACKGROUND OF THE INVENTION

A. Field of the Invention

The field of the present invention relates generally to landscape edging used for creating borders or dividers around various landscape features, such as gardens, lawns, flower beds, trees and the like, so as to form a boundary between adjacent landscaped areas. More particularly, the present invention relates to landscape edging strips that are flexible to use and inexpensive to manufacture. Even more particularly, the present invention relates to such landscape edging strip that is produced by co-extruding different materials and which is can be cut at any point along the strip.

B. Background

Landscape edging strips are utilized for borders or dividers so as to separate one portion of a landscaped area from other portions of the landscaped area or from non-landscaped areas and to provide a minimal barrier to the movement of water between adjacent areas. Because most landscaping does not follow nice straight lines, landscape edging strips are generally made out of materials and configured such that the individual strips are somewhat flexible. In addition, because landscape edging strips must be provided in section lengths that are suitable for sale, transport and handling, as opposed to being provided in single fixed-length sections, it is necessary that a mechanism be provided to interconnect the individual landscaping strips into lengths sufficient to extend the full distance around the desired landscape area. Due to the outdoor environmental use for landscaping edging strips, it is well known that landscape edging strips must be made out of materials that are suitably resistant to corrosion, mildew and pests. Generally, landscape edging strips are configured to be anchored into the ground either directly by hammering or otherwise hitting or pushing the edging strips themselves into the ground or by way of separate stakes that are configured to be placed in the ground so as to hold the strips in their desired position. Because the landscape edging is used in and around areas where gardening tools and activity takes place, it is necessary that the landscape edging be sufficiently durable to maintain its functionality when contact, inadvertent or otherwise, with such tools and activity occurs. In addition, because landscaped areas are generally designed to be visually appealing, it is important that the landscape edging be made out of materials and be configured such that, at the least, it does not significantly detract from the visual nature of the landscaping.

Many different materials are utilized for landscape edging strips to achieve various functional and aesthetic objectives. For instance, edging strips have been made out of relatively thin strips of metal, including aluminum and steel, for some time. Often these metal edging strips are painted green or other colors to attempt to blend in with the landscaped areas and are coated or otherwise treated to reduce the likelihood of corrosion. To solve the inevitable corrosion problem, many manufacturers make the edging strips out of plastic and like materials, which are typically selected for specific cost, appearance, durability, flexibility and weight characteristics. In addition, plastic materials are selected based on their ability to resist cracking, discoloration, ultraviolet light intrusion and mildew. Plastic edging strips can be made in a variety of different shapes by a variety of different process. Some materials are known to have certain characteristics that achieve certain desired objectives but do not do well at others. For instance, a material may be very durable, but be lacking in the flexibility, appearance and/or cost characteristics or result in an edging strip that weighs too much to be practical. As a result, the desired material that provides as much positive attributes as possible often results in a relatively expensive edging strip.

A significant number of prior art landscape edging systems, utilizing a wide range of materials and configured in a variety of different ways, are known in the industry. Some of these prior art edging materials, exemplified by U.S. Patent Publication No. 2003/0024157 to Conde (published Feb. 6, 2003), U.S. Pat. No. 5,720,128 to Smith, et al., U.S. Pat. No. 5,456,045 to Bradley et al. and U.S. Pat. No. Des. 426,322 to Anderson, et al. are configured such that at least a portion of the edging is shaped to permit it to be inserted into the ground to form the edging boundary. For instance, the patents to Bradley, et al. and Anderson and the patent publication to Conde, utilize variable contoured bottom edges that have a series of arches and points and which are tapered to facilitate insertion into the ground. The patent to Smith, et al. describes landscape edging having an elongated vertical plate with a lower longitudinal edge adapted for piercing engagement with the ground. Other patents, such as U.S. Pat. No. 5,375,369 to VerHoeve, U.S. Pat. No. 5,117,583 to Reum, U.S. Pat. No. 4,823,521 to Kontz, Jr. and U.S. Pat. No. 2,782,561 to R. A. Smith, utilize stake portions that is attached to (i.e., part of) the edging strip or attachable to the edging strip and which are configured to be driven into the ground. U.S. Pat. No. 5,301,461 to Zwier discloses a landscape edging that has an elongated ribbon strip configured to receive a ground-engaging stake and U.S. Pat. No. 5,157,867 to Fritch discloses a landscape edging that has a generally horizontal flat mowing strip through which one or more spikes or stakes are driven into the ground. Other landscape edging systems, such as U.S. Pat. No. 3,788,001 to Balfanz, Jr. and U.S. Pat. No. 2,821,809 to Collier, have a portion of the edging strips buried or covered by soil or other landscaping materials.

The different prior art landscape edging systems disclose a variety of connectors used to connect one strip to another. For instance, the patents to Fritch, Reum and Kontz, Jr. identified above disclose the use of separate insertable connectors that fit within tubular sections of adjacent edging strips. The patents to Smith, et al., Bradley, et al., Zwier, Collier, R. A. Smith and Anderson, et al. disclose the use of the attached connectors that interlock, in one form or another, with an adjacent edging strip to form a somewhat continuous strip of landscape edging. The patent to Balfanz, Jr., discloses the use of a generally C-shaped connector with flanges that interconnects the upper portion of T-shaped edging strips.

The various prior art landscape edging systems, including those identified above, have various advantages and disadvantages that affect the cost, functionality and usefulness of the edging strips. For instance, while the art of plastic extrusion in general is well known (for instance for fencing as disclosed in U.S. Pat. No. 3,933,311 to Lemelson and for co-extruded synthetic wood components U.S. Pat. No. 6,579,605 to Zehner and roofing shingles in U.S. Pat. No. 6,546,688 to Parsons), none of the above edging systems disclose or suggest the use of edging strips that are made out of a double-layer plastic extruded material that provides significant cost, weight and appearance benefits with the use of multiple channels for receiving a connector anywhere along the edging strips where it is desired to cut the strip. The patent to Zehner discloses a wood component having an interior layer made out of a first synthetic wood composition layer co-extruded with a outer second synthetic wood composition layer to reduce cost by utilizing an inexpensive and lower weight interior layer integrally formed with the better quality outer layer. Compared to a single layer material, an edging strip made out of multiple layered materials provides the desired characteristics for the edging strip at a significantly reduced overall cost and, if desired, weight. The manufacturing or prior art edging strips generally requires the manufacturer to execute a secondary operation to make the edging strip's connection mechanism, such as drilling holes or making a lap joint. These secondary operations make the edging strip more difficult and more expensive to manufacture. They can also make the edging system (i.e., the edging strip and connection mechanism) more difficult to use. Therefore, what is needed is landscape edging strip that utilizes lower weight and cost materials and which does not require any secondary operations to manufacture or prepare the edging strip for the connector. The preferred edging strip should be relatively inexpensive to make, easy to use and adaptable for use as landscape edging. To be effective, such landscape edging should allow the user to cut the strip at any place desired and still be able to utilize connectors to join two adjacent strips together. In addition, the preferred edging strip should provide an aesthetically appealing boundary.

SUMMARY OF THE INVENTION

The extruded landscape edging system of the present invention solves the problems identified above. That is to say, the present invention discloses a new and useful landscape edging strip and method of making the same that is particularly configured to be relatively inexpensive to make, easy to use and aesthetically appealing. The landscape edging strips of the present invention are made by co-extruding two or more materials together to form an edging strip having one or more interior longitudinally disposed channels that are adaptable for receiving a connector so as to connect with the cut end of an adjacent edging strip to form a somewhat continuous strip of landscape edging. Unlike prior art devices, the landscape edging strips of the present invention reduces the cost by using lower quality interior or core materials and better quality outer or shell material that provides a strong, attractive outer finish without compromising on the qualities desired for the edging strip. The use of continuous channels through the edging strip makes it easier to manufacture, easier for the user to install by allowing the user to cut the edging strip at any point to place a connector and reduces the overall weight (i.e., for handling) of the edging strips.

In the preferred embodiment of the present invention, the landscape edging system includes an edging strip configured with a top surface, a bottom surface, a first end and an opposing second end. The preferred edging strip is manufactured with a shell layer generally encapsulating a co-extruded core layer that has one or more longitudinal channels disposed therein. Each of the channels has a channel wall that cooperates with a connector that is configured to be at least partially disposed in the channel. The preferred connector comprises a sleeve portion having an internal body member with one or more extending portions that are configured to be received in the channels at the ends of two adjoining edging strips, which are received in the sleeve portion. In the preferred embodiment, the core layer is substantially made up of re-grind or recycled plastic material and the thin shell layer is a high quality plastic material. To prevent undesired twisting between and misalignment of adjacent edging strips, the preferred core layer has two or more channels and the connector has two or more extending portions, each of which is configured to be received in one of the channels. To better secure the connector in the channel, the extending portion can have a tapered edge that is configured to be engagingly received by the channel wall or one or more protruding barbs configured to engage the channel wall. A stake member can be used to clamp over or penetrate the edging strip to secure the edging strip to the ground.

The method of manufacturing the landscape edging strip of the present invention includes the steps of providing a first material for a core layer in a first hopper, providing a second material for a shell layer in a second hopper, co-extruding the two layers to generally encapsulate the shell layer around the core layer and to form one or more longitudinal channels in the core layer, and then cutting the edging strip to the desired length. In the preferred embodiment, the first material is a re-grind or recycled material and the second material is a high quality plastic.

Accordingly, the primary objective of the present invention is to provide a landscape edging strip and method of making the same that provides the advantages discussed above and overcomes the disadvantages associated with the presently available landscape edging systems.

It is also an important objective of the present invention to provide a new landscape edging system which is relatively inexpensively manufactured, provides an aesthetically pleasing yet durable surface appearance, is easy to use and is adaptable to a variety of different landscape edging applications.

It is also an important objective of the present invention to provide a landscape edging strip which is adaptable to the use of low cost extrudable materials to reduce the overall cost of the edging strips to the public.

It is also an important objective of the present invention to provide a landscape edging strip that is easy for the consumer to transport to the landscape area and cut to fit the desired landscape boundary.

Another important objective of the present invention is to provide a landscape edging strip that is adaptable to being held securely in place by one or more stakes alongside or through the edging strip into the adjacent soil.

The above and other objectives of the present invention will be explained in greater detail by reference to the attached figures and the description of the preferred embodiment which follows. As set forth herein, the present invention resides in the novel features of form, construction, mode of operation and combination of processes presently described and understood by the claims.

BRIEF DESCRIPTION OF THE DRAWINGS

In the drawings which illustrate the best modes presently contemplated for carrying out the present invention.

DETAILED DESCRIPTION OF THE PREFERRED EMBODIMENTS

Figure 1:
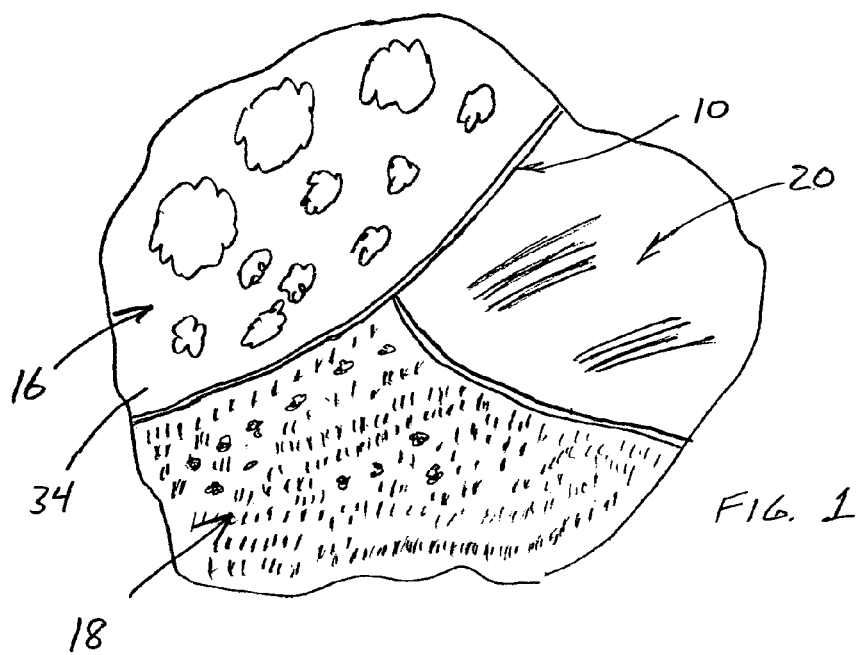
FIG. 1 top plan view showing landscaped and non-landscaped areas separated by a boundary formed from the landscape edging system of the present invention.
Figure 3:
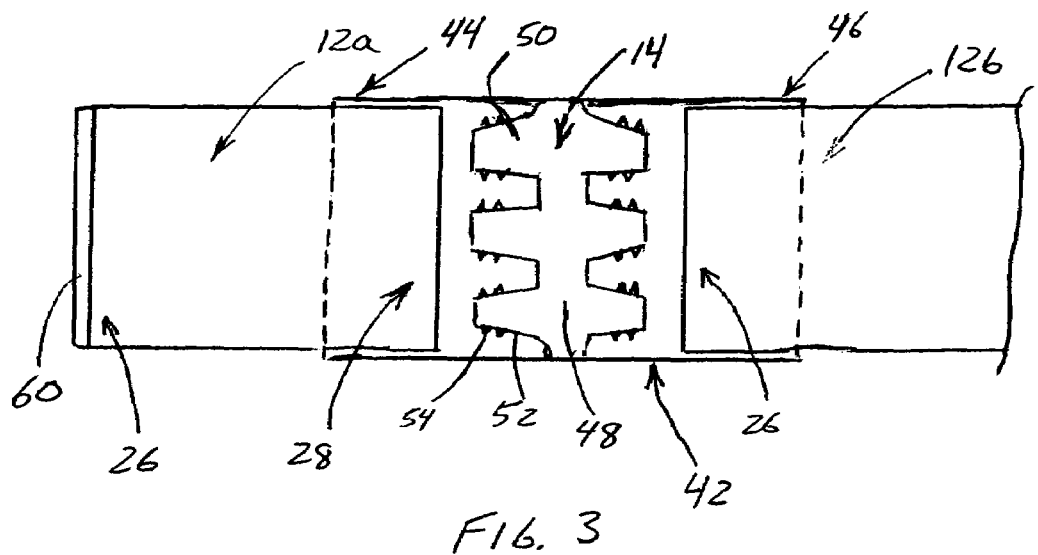
FIG. 3 is a cut-away side view a connector disposed between two adjacent edging strips.

With reference to the figures where like elements have been given like numerical designations to facilitate the reader's understanding of the present invention, and particularly with reference to the embodiment of the present invention illustrated in the accompanying figures, the preferred embodiments of the present invention are set forth below. In the preferred embodiment of the present invention, the landscape edging assembly, identified generally as 10, is comprised of an elongated edging strip 12 and connector 14 for connecting two adjacent edging strips (i.e., 12a and 12b as shown in FIG. 3) to form landscape edging assembly 10 that, as shown in FIG. 1, is adaptable for providing a boundary between two adjacent landscaped areas, such as first landscaped area 16 and second landscaped area 18, or between landscaped area 12 and an adjacent non-landscaped area 20. Although edging strips 12 may be provided in lengths sufficient to complete the entire boundary, edging strips 12 are generally provided in lengths that are somewhat more suitable for storage, transport, retail handling and installation. As set forth in more detail below, edging strips 12 of the present invention may be provided in virtually any length chosen by the manufacturer, based on various manufacturing and retail considerations, such that edging strip 12 can be cut to the desired length if it is too long and/or connected with other, adjacent edging strips (as shown in FIG. 3) to complete the entire boundary.

In the preferred embodiment, edging strip 12 comprises an interior or core layer 22 and an outer or shell layer 24, with the core layer 22 and shell layer 24 preferably being integrally formed by a co-extrusion process such that shell layer 24 effectively encapsulates core layer 22 except at first end 26 and the longitudinally opposed second end 28. Edging strip 12 also has a top surface 30 and bottom surface 32. If desired, top surface 30 can be shaped and configured to provide a surface, such as by providing a wider surface, that makes it easier to hit, push or otherwise place edging strip 12 into ground 34. As set forth below, in one embodiment of the present invention, edging strip 12 has a generally rectangular cross-section to simulate a piece of redwood or other lumber. In addition, a wood grain pattern or design can be embossed in shell layer 24 by various known processes, such as running edging strip 12 through one or more rollers with desired wood grain pattern on them while shell layer 24 is still hot from the manufacturing process.

The interior core layer 22 of edging strip 12 is configured to have one or more longitudinally disposed channels 36 formed by interior channel walls 38. In the preferred embodiment, channels 36 extend the full length of edging strip 12 such that at any place along edging strip 12 where it is cut to fit the desired boundary between various landscaped areas, such as first landscaped area 16, second landscaped area 18 and/or non-landscaped area 20, first end 26 and second end 28 will expose opening 40 into the respective channels 36 for connection to connector 14, as explained in more detail below. This can substantially reduce the cost of manufacturing by eliminating the need for any secondary operations (i.e., drilling holes or forming lap joints) to prepare edging strip 12 for connector 14. Although edging strip 12 can be configured such that core layer 22 has one or more channels 36, the preferred embodiment of edging strip 12 has at least two channels so as to improve the alignment between two adjoining edging strips 12, such as 12a and 12b in FIG. 3, and prevent undesirable rotation of one relative to the other. Connector 14 connecting adjacent single channels 36 in core layers 22 of adjoining edging strips 12a and 12b would tend to allow one to rotate or twist relative to the other which, contrary to the desires of most users of landscape edging, could cause edging strips 12a and 12b to be unaligned at top surface 30 and bottom surface 32. For this reason, two or more channels 36 are preferred.

Figure 2:
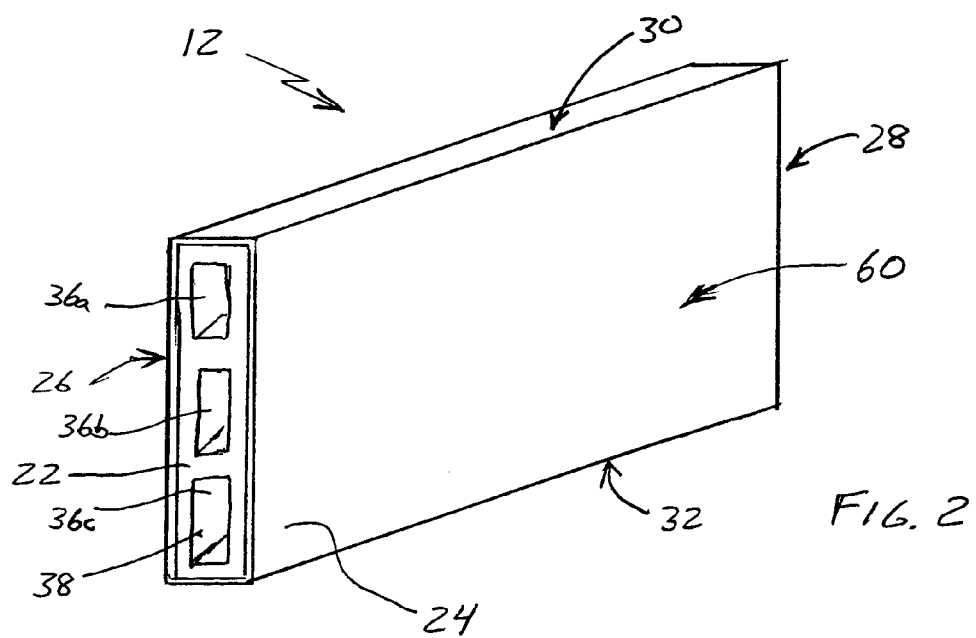
FIG. 2 is an isometric view of the edging strip of the present invention.

As shown in FIG. 2, the preferred embodiment of the edging strip 12 of the present invention has three separate channels 36. The size and configuration of channels 36 should be selected to provide sufficient lateral strength to edging strip 12 to allow it to support itself in a generally upright position against that portion of ground 34 against edging strip 12. In one configuration, the outer dimensions of edging strip 12 is one inch wide, four inches high and twenty feet long with three approximately equally sized channels 36 being approximately ⅜ to ⅝ inch wide and ⅞ to 1 inch high, resulting in core layer 22 approximately ⅛ to 3/16 inch near top surface 30, bottom surface 32 and between middle channel 36b and upper channel 36a and lower channel 36c. In addition to being used for connector 14, channels 36 reduce the overall weight of the completed edging strip 12 and, as set forth below, make it easier to drive stakes through edging strip 12. For instance, an edging strip 12 made according to the present invention way approximately eleven pounds for each twenty foot section, compared to eighteen pounds for a twenty foot section made without channels 36.

In the preferred embodiment of edging strip 12 of the present invention, core layer 22 is comprised of materials that substantially further reduce the cost of manufacturing edging strip 12 (in addition to the use of channels 36 which results in substantially less material). In one configuration, core layer 22 is comprised primarily or entirely of "re-grind" or recycled processed material, which is generally considered a garbage material made up of left-over or generally waste material that is mixed together and re-ground into a base plastic material suitable for extrusion. An example of material suitable for core layer 22 is a high or medium density polyethylene. Unlike the synthetic wood component disclosed in the patent to Zehner, it is not necessary, or even desirable due to the fact that such an appearance would be irrelevant since it is not seen, to make core layer 22 look like wood. As set forth above, however, shell layer 24 can be made to look like wood grain if desired.

In the preferred embodiment, shell layer 24 is comprised of a thin layer of relatively higher quality plastic material that has the characteristics desired for the visual appearance and the functionality of edging strip 12. For instance, material for shell layer 24 can be selected from materials that provide a relatively durable, shiny, stiff, attractive material which is also corrosion, mildew, impact and tear resistant. As an example, shell layer 24 can be approximately 1/32 to 1/16 inch thick and be comprised of a polymer material, such as high density polyethylene, polypropylene, medium density polyethylene and other similar, suitable and conventional plastic materials, including formulations that incorporate one or more of the above polymers. Any such polymers or other materials used for shell layer 24 can include one or more additives to improve the functionality, durability and/or appearance of shell layer 24, such as thermal and ultraviolet stability additives.

Figure 5:
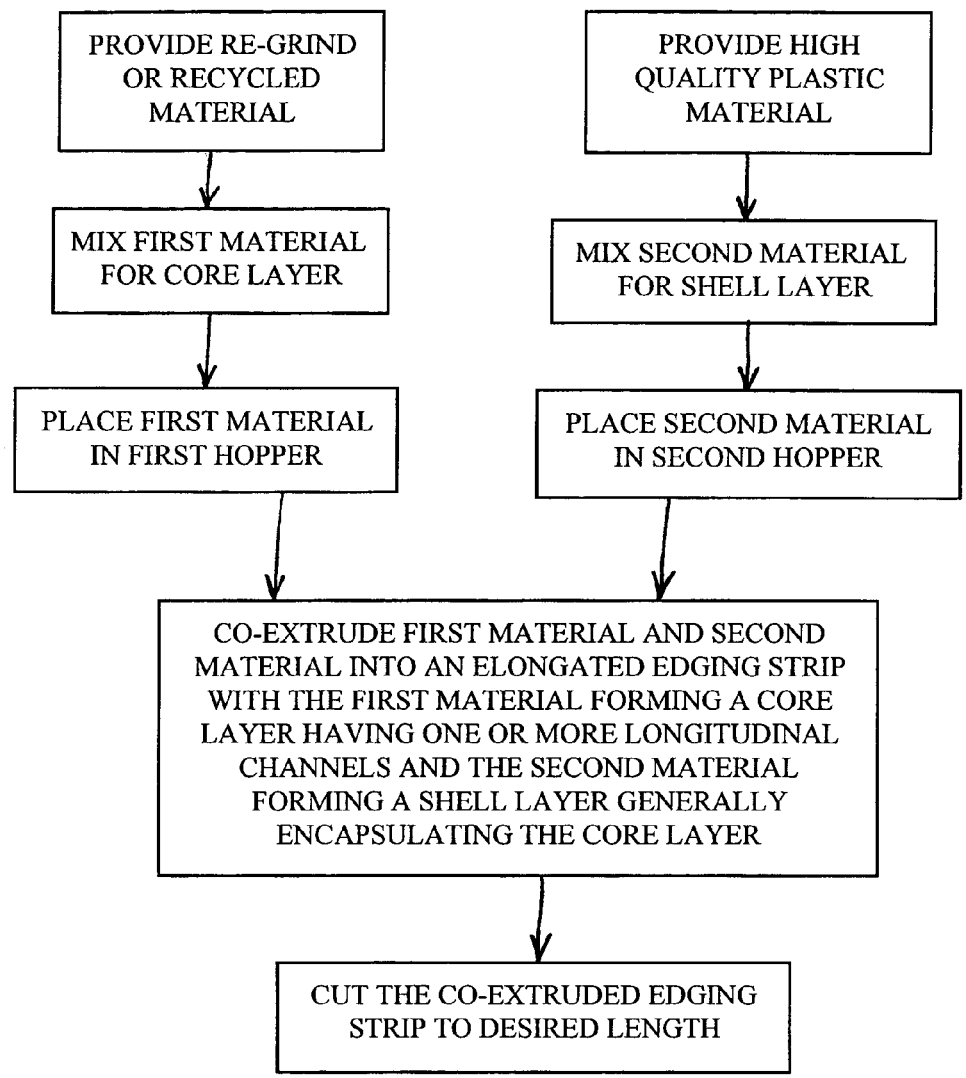
FIG. 5 is a flowchart which shows a process of manufacturing the edging strip shown in FIG. 2.

As stated above, the materials selected for core layer 22 and shell layer 24 are preferably selected from those materials which are capable of extrusion, and in particular co-extrusion with each other, in order to achieve the manufacturing efficiencies and strength characteristics of such processes. As summarized in FIG. 5, the process of manufacturing a preferred embodiment of edging strip 12 begins with preparing the materials to be extruded into edging strip 12. Core material 22 can be prepared by mixing the re-grind or recycled material with other materials and/or additives as desired. Shell material 24 can be prepared by mixing the preferred polymer material with one or more additives to achieve the desired characteristics. Core material 22 and shell material 24 are placed into separate feed hoppers, such as gravity feed or force feed hoppers, where they are delivered in a melt stream to a pair of heated extruders. The extruding process can utilize a specially configured tubing head or die and vacuum calibration systems that draws the materials from the hoppers. In the extruder, the core material 22 and shell material 24 are joined in the same die system to form the desired profile, such as that shown in FIG. 2. The die system for edging strip 12 can be made up of one or more die plates configured to provide the cross-sectional shape desired for edging strip 12 and/or channels 36. The extruded edging strip 12 is then cooled, such as in a cooling chamber or other cooling apparatus, and then cut to the desired length.

In an alternative method of manufacturing edging strip 12, core layer 22 is formed separately from shell layer 24 with one or more channels 36 extruded therein or with one or more channels 36 formed by coring or other like processes (which would, however, require a secondary operation). Once core layer 22 is manufactured, either prior to or after forming channels 36 therein, shell layer 24 is applied to or formed over core layer 22 in a manner that results in the shaped-homogeneous two layer edging strip shown in the figures. As discussed above, the materials for core layer 22 and shell layer 24 can be selected and utilized so as to provide various cost, weight, function and durability characteristics.

Connector 14 should be shaped and configured to cover the ends of two adjoining edging strips , such as 12a and 12b, and cooperate with the one or more channels 36 at either first end 26 or second end 28 of edging strip 12 so as to be received through opening 40 into channels 36, such as upper 36a, middle 36b and lower 36c channels. In the preferred embodiment, connector 14 is configured such that when adjacent edging strips 12a and 12b are joined together to form the desired boundary, as shown in FIG. 1, there is no visible or easily accessible gap between the first end 26 of edging strip 12b and second end 28 of edging strip 12a so as to form continuous edging strip 12. As is known in the art, high and low temperature fluctuations cause contraction and expansion of edging strips 12 such that two adjoining edging strips 12a and 12b will separate. The gap caused by such separation can become filled with dirt or other materials, thereby preventing edging strips 12a and 12b from rejoining. Gaps between adjoining edging strips 12 is not visually desired. As best shown in FIG. 3, connector 14 comprises a channel-shaped sleeve portion 42 having first end 44 and second end 46 with an internal body member 48 that has one or more extending portions 50 thereon configured for being received inside channels 36. The open ends 44 and 46 of connector 14 receive ends 26 and 28 of edging strip 12 while the rest of sleeve portion covers ends 26 and 28 and any gap that exists or may occur therebetween for ends 26 and 28 to engage extending portions 50 on body member 48. In one embodiment, ends 44 and 46 of sleeve portion 42 are sized and configured to snugly receive ends 26 and 28 of edging strip 12. Sleeve portion 42 should be configured to be the same height and thickness dimensions as edging strips 12 and long enough that any expansion of adjacent edging strips, such as edging strips 12a and 12b, will not be sufficient to expose the ends 26 and 28. Body member 48 only needs to be of sufficient size to support extending portions 50. In one configuration, sleeve portion 42 is three to four inches long. Preferably, the number of extending portions 50 on body member 48 correspond with the number of channels in edging strip 12 such that there is one pair of extending portions 50 for each channel 36 on edging strips 12a and 12b. If desired and/or necessary, extending portions 50 can have a tapered edge 52 to more easily and snugly fit within channels 36 and/or comprise one or more protruding barbs 54 along edge 46 that cooperate with interior channel wall 38 of channel 36 to more securely engage edging strips 12a or 12b, as shown in FIG. 3. Connector 14 can be made out of various materials, including metals, plastic, composites and others, by a variety of different processes well known in the art.

Figure 4:
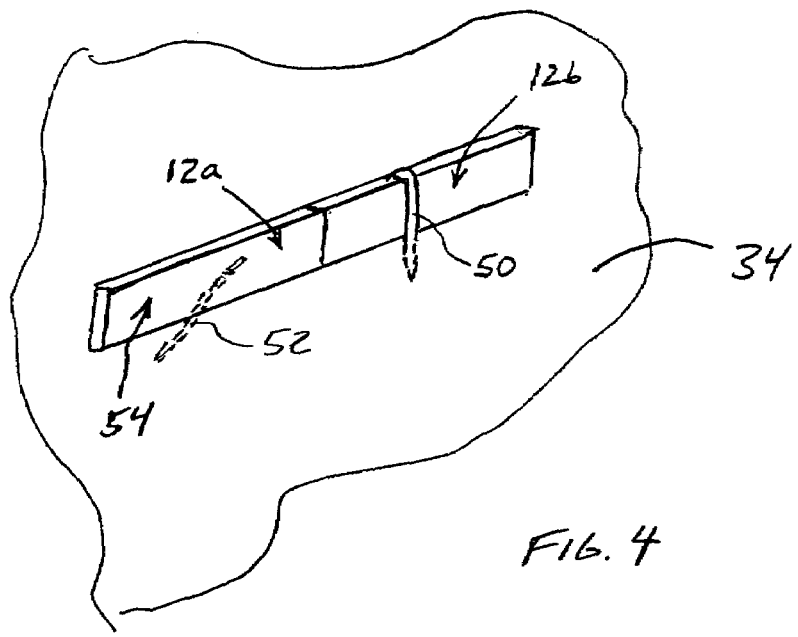
FIG. 4 is an isometric view of the edging strip of the present invention secured to the ground by stakes.

In one embodiment of the landscape edging system 10 of the present invention, a portion of edging strip 12 is buried or inserted into ground 34 so as to support edging strip 12 in a generally vertical position relative to ground 34. In another embodiment of the present invention, edging strips 12 can be secured in their desired location by utilizing hook stakes 56 or straight stakes 58, as shown in FIG. 4. The hook portion of hook stakes 56 are configured to hook over top surface 30 when the sharpened portion of hook stakes 56 are driven into ground 34 next to edging strip12. The sharpened end of straight stakes 58 are driven through shell layer 24 and core layer 22 on side surface 60 of edging strip 12 and then into ground 34 so as to secure edging strips 12 in place.

When two adjoining edging strips 12 are joined together, the open channels 36 at the first 26 and second 28 ends are closed off. At the end where it does not join to another edging strip 12, however, channels 36 will remain open. If desired, landscape edging system 10 of the present invention can further utilize an end cap 62, shown in FIG. 3, at the otherwise open end 26 or 28 to close it off. End cap 62 should be configured to fit snugly within channels 36. In one configuration, end cap 62 has one or more extending portions (not shown) similar in design and operation to extending portions 50 on connector 14, with or without tapered edge 52 and/or barbs 54. In the preferred embodiment, end cap 62 is configured to have the same profile as edging strips 12 such that when it is attached to edging strip 12 it does not protrude or otherwise stand out from edging strip 12. In another configuration, edging strip 12 can be made such that one end, such as first end 26 or second end 28, is closed.

In use, landscape edging system 10 of the present invention is used to form the boundary between first landscaped area 16 and second landscaped area 18 and/or non-landscaped area 20, as shown in FIG. 1. If the boundary is longer than the length of a single edging strip 12, two or more edging strips, such as edging strips 12a and 12b, can be connected at the adjoining ends (i.e., second end 28 of edging strip 12a and first end 26 of edging strip 12b), by connector 14, as shown in FIG. 3. Ends 26 and 28 are pushed into ends 44 and 46 of sleeve portion 42 so that channels 36 will engage extending portions 50. In the preferred embodiment, extending portions 50 on body member 48 fit tightly into an equal number of channels 36 in core layer 22 of edging strip 12. As exemplified in FIGS. 2 and 3, core layer can have three channels, upper channel 36a, middle channel 36b and lower channel 36c, for receiving extending portions 50 therein. The use of multiple channels 36 significantly reduces the likelihood that the adjoining edging strips 12a and 12b will rotate or twist relative to each other. Adjoining edging strips 12a and 12b are joined with connector 14 between the ends to form a somewhat continuous strip of edging for the boundary. If used, tapered edge 52 and/or barbs 54 on extending portions 50 interact with channel wall 38 to improve the contact between connector 14 and edging strips 12. Once joined, edging strip 12 is placed into ground 34 by partially burying it or by hammering, hitting or pushing on top surface 32 so as force bottom surface 32 into ground 34. When insertion of bottom surface 32 into ground 34 is not possible or desirable, edging strips 12 can be supported on ground 34 by use of one or more hook stakes 56 that hook over top surface 30 or straight stakes 58 (such as long nails) that are driven through the side surface 60 of edging strip 12 into ground 34, as shown in FIG. 4. The use of channels 36 facilitates use of straight stakes 58 or similar devices to secure the location of edging strips 12. If desired, one or more end caps 62 can be placed over an open first 26 and/or second 28 end of edging strip 12 to close off any open channels 36.

While there are shown and described herein certain specific alternative embodiments of the invention, it will be readily apparent to those skilled in the art that the invention is not so limited, but is susceptible to various modifications and rearrangements in design and materials without departing from the spirit and scope of the invention. Hence, it is to be understood that the invention is capable of variation and modification within the scope of the appended claims. In particular, it should be noted that the present invention is subject to modification with regard to the dimensional relationships set forth herein and modifications in assembly, materials, size, shape and use.

What is claimed is:

1. A landscape edging system, comprising:
   an edging strip having a top surface, a bottom surface, a first end and a second end, said edging strip having a relatively thin shell layer disposed around a core layer, said core layer having one or more longitudinal channels disposed therein, each of said channels having a channel wall; and
   a connector having a channel-shaped sleeve portion with an open first end and an open second end, said open first end and said open second end configured to receive said first end of said edging strip or said second end of said edging strip in said sleeve portion, said sleeve portion having an internal body member disposed therein, said internal body member having one or more extending portions thereon, each of said one or more extending portions configured to be received in one of said channels of said edging strip.

2. The landscape edging system according to claim 1, wherein said core layer and said shell layer are co-extruded such that said shell layer substantially encapsulates said core layer.

3. The landscape edging system according to claim 1, wherein said core layer is substantially made up of re-grind or recycled material.

4. The landscape edging system according to claim 1, wherein said shell layer is a high quality plastic.

5. The landscape edging system according to claim 1, wherein said core layer is substantially made up of re-grind or recycled material, said shell layer is a high quality plastic and said core layer and said shell layer are co-extruded.

6. The landscape edging system according to claim 1, wherein said core layer has two or more longitudinal channels and said connector has two or more extending portions, each of said extending portions configured to be received in one of said channels.

7. The landscape edging system according to claim 1, wherein said one or more extending portions has a tapered edge, said tapered edge configured to be engagingly received by said channel wall.

8. The landscape edging system according to claim 1, wherein said one or more extending portions has one or more protruding barbs configured to engage said channel wall.

9. The landscape edging system according to claim 1, wherein each of said channels in said core layer has an opening at said first end and said second end of said edging strip.

10. The landscape edging system according to claim 1 further comprising a stake member configured to engagingly secure said edging strip to the ground.

11. The landscape edging system according to claim 10, wherein said stake is configured to penetrate a side of said edging strip.

12. A landscape edging system, comprising:
    an edging strip having a top surface, a bottom surface, a first end and a second end, said edging strip having a relatively thin shell layer disposed around a core layer, said core layer and said shell layer co-extruded such that said shell layer substantially encapsulates said core layer, said core layer having two or more longitudinal channels disposed therein, each of said channels having a channel wall; and
    a connector having a channel-shaped sleeve portion with an open first end and an open second end, said open first end and said open second end configured to receive said first end of said edging strip or said second end of said edging strip in said sleeve portion, said sleeve portion having an internal body member disposed therein, said internal body member having one or more extending portions thereon, each of said one or more extending portions configured to be received in one of said channels of said edging strip.

13. The landscape edging system according to claim 12, wherein said core layer is substantially made up of re-grind or recycled material.

14. The landscape edging system according to claim 12, wherein said shell layer is a high quality plastic.

15. The landscape edging system according to claim 14, wherein said core layer is substantially made up of re-grind or recycled material.

16. The landscape edging system according to claim 12, wherein said one or more extending portions has a tapered edge, said tapered edge configured to be engagingly received by said channel wall.

17. The landscape edging system according to claim 12, wherein said one or more extending portions has one or more protruding barbs configured to engage said channel wall.

18. The landscape edging system according to claim 12 further comprising a stake member configured to engagingly secure said edging strip to the ground.

19. A landscape edging system, comprising:
    an edging strip having a top surface, a bottom surface, a first end and a second end, said edging strip having a relatively thin and integrally formed shell layer disposed around a core layer, said core layer and said shell layer co-extruded such that said shell layer substantially encapsulates said core layer, said core layer having two or more longitudinal channels disposed therein, each of said channels having a channel wall; and
    a connector having a channel-shaped sleeve portion with an open first end and an open second end, said open first end and said open second end configured to receive said first end or said second end of said edging strip in said sleeve portion, said sleeve portion having an internal body member disposed therein between said first end and said second end thereof, said internal body member having one or more extending portions thereon, each of said one or more extending portions configured to be securely received in one of said channels of said edging strip.

20. The landscape edging system according to claim 19, wherein said core layer is substantially made up of re-grind or recycled material and said shell layer is a high quality plastic.

* * * * *